UNITED STATES PATENT OFFICE.

CHARLES JONES, OF DERBY, COUNTY OF DERBY, ENGLAND.

CARBONIZING STEEL.

SPECIFICATION forming part of Letters Patent No. 420,539, dated February 4, 1890.

Application filed May 21, 1889. Serial No. 311,613. (No specimens.)

*To all whom it may concern:*

Be it known that I, CHARLES JONES, molder, a subject of the Queen of Great Britain, and a resident of Derby, in the county of Derby, England, have invented certain new and useful Improvements in Carbonizing Steel; and I do hereby declare the following to be a full, clear, and exact description of the invention.

The object of my invention is to carbonize steel, so that it is greatly improved in quality and strength, at very little cost and by a very simple process.

To carry my invention into effect, I take fragments of steel of suitable size and quality—as, for instance, the plates of old railway or other carriage springs broken or cut up—and I clean the pieces thoroughly by immersing them for a sufficient time in a solution of diluted sulphuric or other suitable acid, and then boiling them in water, and afterward washing them to remove all traces of oxide or dirt. I dip the pieces of cleaned steel into oil or grease, which may be of any kind, either animal, vegetable, or mineral, and I then dip them into soot from which cinders and other impurities have been removed, so that they become coated with a layer of sufficient thickness of the soot adhering to the oil with which their surface has been coated, as described, which thickness may vary more or less, but may be about one-quarter of an inch. The pieces of steel, with their adhering coating of soot, are then placed in a suitable metal box or vessel, which is filled with powdered carbon pressed closely round the pieces of steel, and the box is then covered. The box, with its contents, is then placed in a furnace and is submitted for a sufficiently long time (which may be from thirty hours upward) to a heat of about 1,400° Fahrenheit, and it is then withdrawn and allowed to cool very slowly. When cooled, the pieces of steel are removed and can be melted into blocks or ingots, which can be afterward rolled, welded, hammered, and otherwise treated and manufactured in the usual way. The steel so treated is uniform in quality and is very greatly improved and its value enhanced for all purposes for which such steel is ordinarily used.

The soot with which the steel pieces are coated, as described, may be the ordinary soot deposited from chimneys or furnaces, cinders and other foreign matters being removed, so as to leave it as pure as possible.

The carbon with which the box is filled round the pieces of steel consists, preferably, of the hard carbon from gas-retorts reduced to powder.

I claim—

1. The process which consists in dipping pieces of ordinary steel into oil or grease and then giving them a coating of soot and exposing them to heat in a furnace in contact with powdered carbon, substantially as described.

2. The process which consists in carbonizing steel by first cleaning it with diluted acid, boiling it in water and washing it, dipping it into oil or grease, then dipping it into soot, placing it in a box packed with powdered carbon, exposing it to heat in a furnace, and afterward allowing it to cool slowly, substantially as described.

In testimony that I claim the foregoing I have hereunto set my hand this 18th day of April, 1889.

CHARLES JONES.

Witnesses:
B. ERIC SMITH,
I. W. ROWBOTHAM.